United States Patent [19]

Cole

[11] Patent Number: 4,862,990
[45] Date of Patent: Sep. 5, 1989

[54] DOWNHOLE SEISMIC SOURCES

[75] Inventor: Jack H. Cole, Ponca City, Okla.
[73] Assignee: Conoco Inc., Ponca City, Okla.
[21] Appl. No.: 292,583
[22] Filed: Dec. 30, 1988
[51] Int. Cl.$^4$ ............................................. G01V 1/04
[52] U.S. Cl. .................................... 181/106; 181/119
[58] Field of Search .............................. 181/102-106, 181/119, 120; 367/25, 143, 911, 912

[56] References Cited

U.S. PATENT DOCUMENTS

| | | | |
|---|---|---|---|
| 2,552,970 | 5/1951 | Horsley et al. | 367/146 |
| 3,718,205 | 2/1973 | Fair et al. | 181/106 |
| 3,721,311 | 3/1973 | Smith | 367/143 |
| 4,215,426 | 7/1980 | Klatt | 367/83 |
| 4,396,088 | 8/1983 | Bayhi | 181/120 |
| 4,682,669 | 7/1987 | Weber | 181/114 |
| 4,697,255 | 9/1987 | Howlett | 367/146 |
| 4,722,417 | 2/1988 | Selsam | 181/119 |
| 4,773,501 | 9/1988 | Bedole et al. | 181/106 |

Primary Examiner—Brian S. Steinberger

[57] ABSTRACT

A downhole seismic signal source (vibrational or impulsive) capable of producing a signal of sufficiently high energy to permit the tool to be used in a deep wellbore (exceeding 4000 feet). A piston rod having two pistons reciprocates in an elongated cylindrical housing. An electrohydraulic valve controls the flow of hydraulic fluid to opposite sides of a first piston to control the piston rod's vertical movement. The second piston is positioned between a fluidic spring which balances the pressure of the wellbore fluid and a reservoir of hydraulic fluid which inflates a flexible bladder to produce the seismic signal in the wellbore fluid.

12 Claims, 2 Drawing Sheets

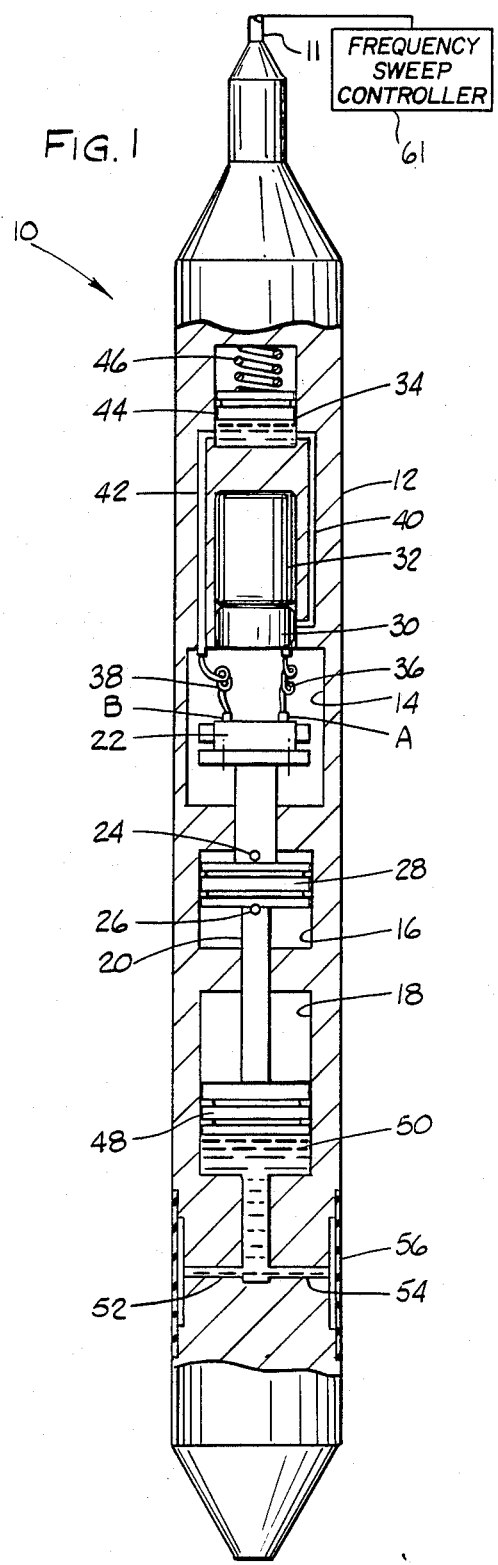
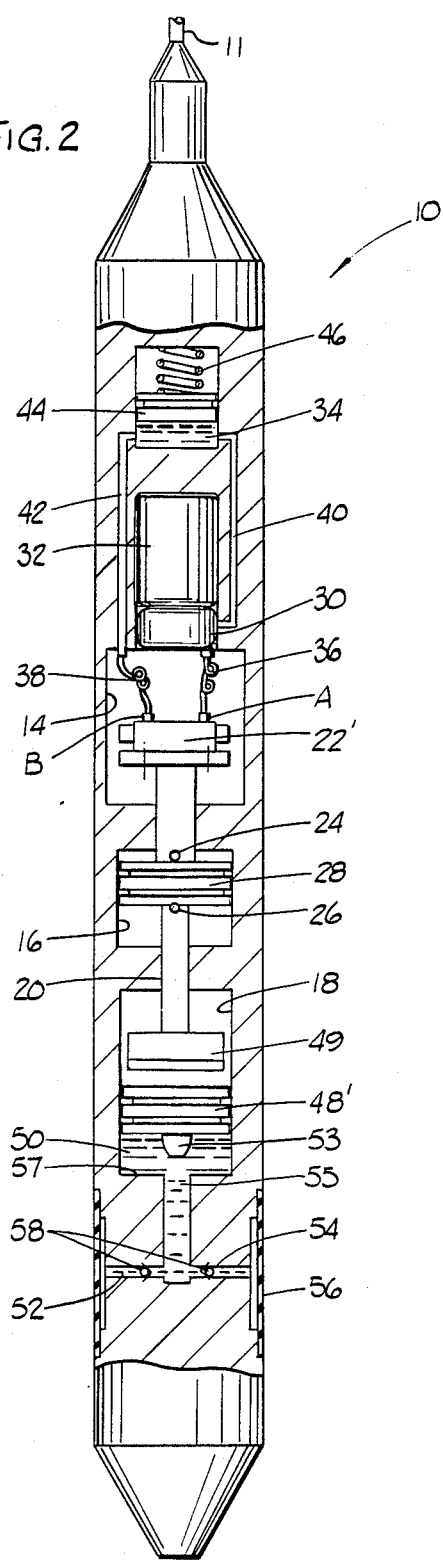

DOWNHOLE SEISMIC SOURCES

BACKGROUND AND SUMMARY OF THE INVENTION

The present invention relates to the field of seismic signal generation. More particularly, it relates to a tool capable of the production of seismic signals, within a borehole, of sufficiently high energy to permit the tool to be used in a deep wellbore.

Many currently available seismic signal generators each have problems which make them unsuitable for use in deep wellbores, i.e., in excess of 4000 feet. Those generators in which the signal is produced on the surface and then transmitted downhole, produce signals that are too weak to permit usage of significant depths. Other generators, such as air guns and perforating guns which locate the source downhole, are capable of producing high energy signals but also produce gas bubbles which create long lasting oscillations in the borehole fluid, thereby inhibiting any sort of medium to high frequency repetition.

The present invention describes a seismic signal source 49 of both the vibrator-type and the impulse-type capable of generating signals of sufficient strength to permit the tool to be used in deep wells for a variety of purposes (e.g., cross-hole seismic measurements, long-spaced and sonic logging tools, downhole lateral seismic systems, and inverted VSPs [Vertical Seismic Profiles]). The invention comprises a downhole signal source including an electric motor and pump that powers a double-headed piston. The pump supplies hydraulic fluid to opposite sides of a first piston head on a piston rod under the control of an electrohydraulic valve. A second piston head (which may be fixed or free-floating) on the same piston rod compresses a fixed amount of hydraulic fluid thereby expanding a flexible bladder which is immersed in wellbore fluid to transmit the desired compressive or impulsive signals to the borehole. The second piston head can compress a fluidic spring (pneumatic or hydraulic) to (a) store energy and increase the magnitude of the signal generated and (b) balance the wellbore fluid pressure which compresses the bladder.

Other features, advantages, and characteristics of the present invention will become apparent after a reading of the following detailed description of the preferred embodiments.

BRIEF DESCRIPTION OF THE DRAWINGS

FIG. 1 is a side elevation in partial section of a first embodiment of a seismic source useful as a vibrator;

FIG. 2 is a side elevation in partial section of a second embodiment of a seismic source useful as an impulse generator.

DETAILED DESCRIPTION OF THE PREFERRED EMBODIMENTS

Figure 3:
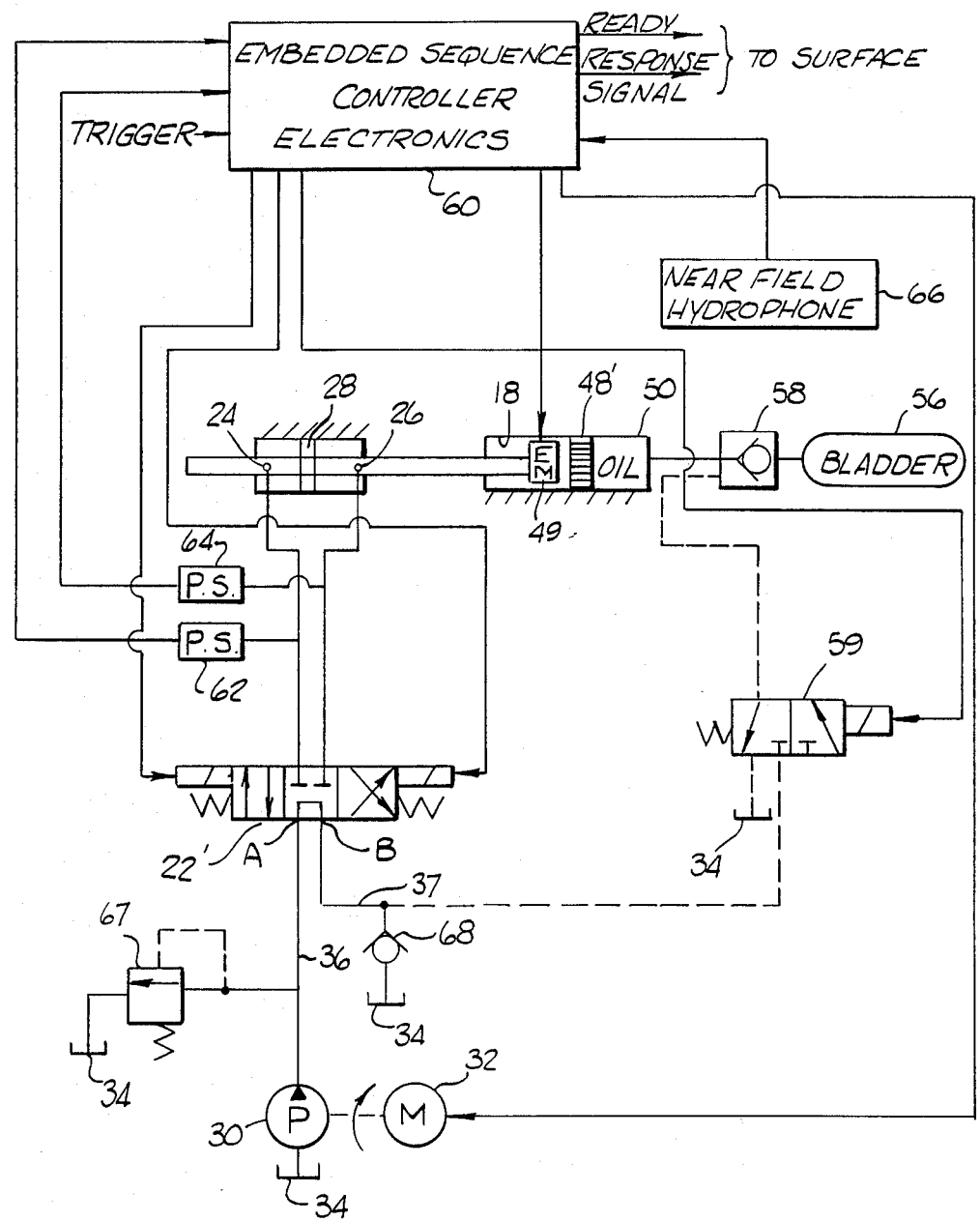
FIG. 3 is a schematic diagram of the electrohydraulic control circuit to be used with the present invention, particularly with the embodiment of FIG. 2.

A first preferred embodiment of the electrohydraulic seismic signal source of the present invention is shown in FIG. 1 generally at 10. The signal source 10 may form a part of a logging tool or other measuring or testing apparatus requiring a signal source. Source 10 is attached to a wireline 11 and includes an elongated cylindrical housing 12. Housing 12 defines three cylindrical chambers 14, 16 and 18. A piston rod 20 interconnects the chambers 14, 16 and 18. Atop piston rod 20 in chamber 14, rides a servovalve 22 which controls the flow of fluid to and from ports 24 and 26 positioned above and below first piston head 28, respectively, in chamber 16. Both electrical power and electronic signals can be transmitted through electrical conductors contained within wireline 11, which also supports the weight of signal source 10 and other associated tools.

A small hydraulic pump 30 powered by electrical motor 32 pumps fluid from and to reservoir 34 through coiled flexible tubing 36 and 38, respectively, which are attached to ports A and B on 4-way servovalve 22. Suction line 40 and return line 42 provide egress and ingress for reservoir 34. A piston 44 biased by spring 46 provides back pressure to reservoir 34 insuring fluid flow through suction line 40 to pump 30. Commonly used hydraulic system components, such as filters and small accumulators can be incorporated but have been omitted from the drawing for clarity.

A second piston head 48 is fixed to piston rod 20 for reciprocal movement in chamber 18. A series of annular seals on each of the piston heads 28 and 48 inhibit flow from one side of the piston head to the other. A (gas or liquid) fluidic spring occupies the portion of chamber 18 above piston head 48. The purpose of the fluidic spring is twofold: a) it offsets the pressure of the borehole fluid surrounding bladder 56 enabling the hydraulic system to operate at about 3000 psi pressure and, (b) it stores energy on the expansion stroke of piston head 48 to increase the amount of energy imparted to hydraulic fluid 50 on the compressive stroke (expansion and compression being defined in relation to hydraulic fluid 50). A fixed volume of clean hydraulic fluid 50 is trapped below piston head 48 and is forced outwardly through lateral ports 52, 54 on the compressive stroke of piston head 48 to expand elastomeric bladder 56 producing the compressive wave (or impulse) in the surrounding borehole fluid (not shown). This disturbance in the borehole fluid becomes the transmitted seismic signal. The mass of housing 12 must be sufficient to provide an adequate reaction mass for vibrating compressive piston 48 to avoid vertical oscillation of the tool 10, rather than the periodic expansion of bladder 56 that is desired. Fluid 50 and bladder 56 serve to isolate the internal parts of tool 10 from the corrosive and abrasive wellbore fluid.

A second embodiment of the seismic signal source 10 of the present invention is shown in FIG. 2. The FIG. 2 embodiment is similar in most all respects to the FIG. 1 device, except that piston head 48' is a free floating piston, rather than being fixed to piston rod 20 and, an electromagnet 49 which is fixed to the end of rod 20, provides the means to couple and uncouple piston head 48' to and from rod 20. In addition, since this is an impulsive seismic source, the fluid passageway from the bottom portion of chamber 18 to bladder 56 is provided with at least one pilot-operated check valve 58 to prevent bouncing of the signal caused by alternate expansion and contraction of bladder 56 by internal and external pressure. A protrusion 53 on piston head 48' is received in recess 55 in the lower end of chamber 18 and serves to decelerate the piston head 48' as it reaches the end of its stroke so as to avoid impact with the chamber end wall 57. Also, a 4-way, 3-position solenoid valve 22' is used in lieu of servovalve 22 atop piston rod 20.

The control system for the electrohydraulic seismic signal source 10 of FIG. 2 is shown schematically in FIG. 3. A sequence controller electronics package 60 can be embedded in the downhole tool 10. Electronic signals will be transmitted to and from the surface via wireline 11. Alternatively, the size and number of electrical signals transmitted to and from the surface can be limited by equipping signal source 10 with a downhole battery pack (not shown). Pressure sensors 62 and 64 will be positioned in the flow lines feeding ports 24 and 26, respectively, to monitor the pressure above and below piston 28 (and hence, the position thereof), and that information fed to sequence controller 60 for properly sequencing 3-position solenoid valve 22′, electromagnet 49 and a 2-position solenoid valve 59 for controlling fluid flow to pilot-operated check valve 58. (Note, solenoid valve 59 is hidden behind servovalve 22 in FIG. 2.) An output signal from a near field hydrophone 66 (which may be inside or outside housing 12) can be provided to the surface through wireline 11. This signal can be used for phase compensation purposes, correlation and zero time reference for use with the recorded seismic signals.

A safety relief valve 67 can be provided in the line 36 or built directly into pump 30, in order to avoid burning up the pump or motor should a blockage occur. Further, it is preferred that line 37 (or pump 30) be provided with a check valve 68 to provide a minimum pressure of 50–100 psi pilot pressure for operating pilot-operated check valve 58.

Assuming the electrohydraulic seismic signal system 10 has just completed a cycle with the generation of a seismic pulse, the operation of the FIGS. 2 and 3 embodiment will now be described. Electronic controller 60 sends a signal to solenoid valve 22′ shifting it to the right (as shown in FIG. 3) connecting pump 30 to port 24, and simultaneously continues to send a signal energizing motor 32 to operate pump 30 thereby providing fluid to the top side of piston head 28 (FIG. 2) driving it downwardly. As the piston head 28 nears the limit of its movement, pressure sensor 62 senses an increase in pressure in the upper part of chamber 16 and sends a signal to controller 60. Electronics controller 60, in turn, energizes electromagnet 49 to recapture floating piston 48′, sends a signal to solenoid valve 59 moving it to its leftmost position, and sends a signal to 3-position solenoid valve 22′ moving through its center position to its leftmost position connecting the pump to port 26.

As solenoid valve 59 moves to its leftmost position, pilot pressure in line 37 will be connected to pilot-operated check valve 58 enabling hydraulic fluid to flow back from bladder 56 to reservoir 50. As mentioned earlier, the hydraulic fluid in reservoir 50 is a fixed amount. Therefore, a separate hydraulic control circuit must be provided for operating check valve 58 so as not to intermingle this control fluid with the bladder inflation fluid. Such non-commingling pilot-operated check valves are well-known and commercially available. Hydraulic fluid emerging from port 26 will push piston head 28 upwardly. As it does so, piston head 48′ (and electromagnet 49) will compress a fluidic spring contained in chamber 18 above piston 48′ This fluidic spring may be either gas or compressible liquid (e.g. silicone fluid). The amount of fluid above and below piston head 48′ can be adjusted by adding or removing fluid through surface ports (not shown) which communicate through pilot-operated check valves with chamber 18.

As piston head 28 reaches the upper limit of its movement, pressure sensor 64 sends a signal to electronic controller 60, which in turn, removes actuation signals from solenoid valves 22′ and 59 and sends a ready signal to the surface so that a new operation may be triggered. The trigger signal from the surface causes electronic control circuit 60 to reduce the power to electromagnet 49 until the threshold retaining force is reached, with solenoid valve 59 to its rightmost position and solenoid valve 22′ to its centered position (as pictured in FIG. 3). Since solenoid valve 59 is in a blocking position, pump 30 cycles fluid through a closed loop to and from reservoir 34.

It is noteworthy that the force tending to separate piston head 48′ from electromagnet 49 during upward movement is comparatively small. The lower surface of electromagnet and upper surface of piston head 48′ are both machined flat, smooth and parallel surfaces to provide intimate surface contact. Further, the differential surface upon which the fluidic spring acts (i.e., the surface area of the upper surface of piston 48′ minus the surface area of electromagnet 49), is relatively small and, hence, so is the resultant force. However, as the piston head 48′ begins to more downwardly, its entire upper surface is exposed to the force of the fluidic spring increasing the impulsive force to hydraulic fluid in reservoir 50 significantly. It is this substantial increase in impulsive force that is responsible for the seismic signal generated by the rapidly expanding bladder 56.

Depending upon the rate of repetition of cycles, it may be desirable to cut power to motor 32 so as to inactivate pump 30 between slow cycles. However, for most fast cycling, such pump interruption is unnecessary.

The electrohydraulic control system for the FIG. 1 embodiment would preferably include means to sweep the frequency through a broad band (e.g., 10–500 Hz) as part of the electronic control which could be positioned uphole or downhole or with portions of the controls in each position. The frequency sweep controller 61 can be part of the downhole controller electronics 60 for the FIG. 1 embodiment or can be located partially or completely uphole with signals sent to the downhole tool. Conventional state-of-the art electronic control technology can be employed to operate the FIG. 1 vibrator such as, for example, is available from Pelton Company, Inc. identified as Pelco Advance II. All of the various sweep signals commonly used in surface and marine vibrator seismic operations may be used as input to the controller. In addition to (or in lieu of) pressure sensors 62 and 64 shown in FIG. 3, a position detecting device such as a linear variable differential transformer (LVDT) or other non-contact sensor can be used with piston rod 20 to provide position feedback to the control system.

Various changes, alternatives and modifications will become apparent to one of ordinary skill in the art following a reading of the foregoing specification. It is intended that all such changes, alternatives and modifications as fall within the scope of the appended claims be considered part of the present invention.

I claim:

1. A downhole seismic signal source for generating high energy seismic signals in a wellbore fluid which has a particular fluid pressure, said seismic source comprising:

a. an elongated cylindrical housing which may be suspended upon a wireless in a wellbore;

b. an electro-hydraulic control system for regulating a frequency and an amplitude of said seismic signals including
   (i) a hydraulic portion of said electro-hydraulic control system which is entirely received within said housing so that it may be positioned downhole, and
   (ii) a fluid spring for storing energy to be used in signal generation;
c. a seismic signal generating component forming a portion of said housing, said signal generating component including
   (i) vertically operable piston means operably engaged with said fluidic spring;
   (ii) a flexible, expandable bladder at least partially in contact with said wellbore fluid; and
   (iii) a fixed amount of hydraulic fluid for inflating said expandable bladder under influence of said vertically operable piston means responsive to said electro-hydraulic control system, said fluidic spring amplifying the amplitude of the seismic signals generated by inflation of said expandable bladder.

2. The downhole seismic source of claim 1 wherein said vertically operable piston means comprises a first piston head reciprocated within a first cylindrical chamber by fluid pressure.

3. The downhole seismic source of claim 2 wherein the fluid pressure within said first cylindrical chamber is supplied by a hydraulic pump operated by an electric motor, said hydraulic pump and said electric motor each being contained within said housing.

4. The downhole seismic source of claim 3 wherein said electrohydraulic control means further comprises an electrohydraulic valve for alternately connecting said pump to a first side of said first piston head and a second side of said first piston head to a fluid reservoir.

5. The downhole seismic source of claim 4 wherein said vertical piston means further comprises a second piston head interconnected to said first piston head and reciprocated within a second cylindrical chamber to compress said fixed portion of hydraulic fluid inflating said expandable bladder to generate said seismic signals.

6. The downhole seismic source of claim 5 wherein said second piston head alternatively compress said fluidic spring on its upward stroke and said fixed portion of hydraulic fluid on its downward stroke.

7. The downhole seismic source of claim 6 wherein said second piston head comprises a free piston which is interconnected to said first piston head by an electromagnet which is fixedly attached thereto.

8. The downhole seismic source of claim 7 further comprising at least one pilot operated check valve positioned between said free floating piston head and said expandable bladder to eliminate bouncing.

9. The downhole seismic source of claim 7 further comprising a plunger positioned on a leading face of said free floating piston head, said plunger being received in a cylindrical aperture formed on one end of said second cylindrical chamber, the interaction between said plunger and said aperture serving to decelerate said free piston.

10. The downhole seismic source of claim 7 wherein said free piston has a flat upper surface which is only moderately larger in diameter than said electromagnet, whereby when said electromagnet reaches a minimum threshold holding force and said free piston becomes separated therefrom, there is a significant increase in surface area of said flat upper surface engaged by said fluidic spring resulting in a significant increase in a net force driving said free piston downwardly.

11. The downhole seismic source of claim 5 wherein said seismic source comprises means to sweep the frequency of said vibrator through a broad band of between about 10 Hz and 500 Hz.

12. A method of generating seismic signals in a wellbore fluid comprising
   a. suspending an electro-hydraulic seismic signal source downhole within a borehole immersed in said wellbore fluid,
   b. controlling a first piston head of said electro-hydraulic seismic signal source with hydraulic fluid to move said piston alternatively upwardly and downwardly,
   c. interconnecting a second piston head with said first piston head for movement therewith, said second piston head alternatively
      (i) compressing a fluidic spring to store energy and
      (ii) compressing a fixed volume of hydraulic fluid when said stored energy is released to drive said hydraulic fluid into, and thereby expand, an elastomeric bladder generating said seismic signal.

* * * * *

UNITED STATES PATENT AND TRADEMARK OFFICE
CERTIFICATE OF CORRECTION

PATENT NO.   :  4,862,990

DATED        :  September 5, 1989

INVENTOR(S)  :  Jack H. Cole

It is certified that error appears in the above-identified patent and that said Letters Patent is hereby corrected as shown below:

Column 1, line 24, delete "49".

Column 4, line 16, insert --49-- after electromagnetic.

Signed and Sealed this

Third Day of April, 1990

Attest:

HARRY F. MANBECK, JR.

*Attesting Officer* — *Commissioner of Patents and Trademarks*